Patented May 3, 1927.

1,627,325

UNITED STATES PATENT OFFICE.

ARTHUR L. HALVORSEN, OF PERTH AMBOY, NEW JERSEY.

PROCESS OF MAKING A STABLE HYDROGEN PEROXIDE.

No Drawing. Application filed July 2, 1921. Serial No. 482,170.

One object of the invention is to provide a process for the manufacture of hydrogen peroxide of a concentration, purity and stability which will allow long distance transportation, or storage for a considerable time, without notable loss of strength, and hence without material increase in cost, due to freight charges and loss by decomposition in transit, per unit of consumer's strength of product. This process will allow the manufacture to be carried out on a large scale at the most suitable place and the shipment of the product to be made to any far away market of the world.

Another object is to provide an alcoholic solution of the hydrogen peroxide, which will find other uses than the usual water solution of hydrogen peroxide, due to being soluble in some cases when the water solution is not soluble or in cases where the presence of water is objectionable.

With these objects in view, the invention consists in causing reaction between a peroxide such as sodium or barium peroxide (hereinafter referred to as "a peroxide of an alkali-forming metal") and an acid preferably in alcoholic solution, to form hydrogen peroxide and the corresponding salt, separating the salt and solution (which can be accomplished by filtration), adding alcohol to the solution, if this should be required in order to cause further separation of salt, removing any salt thus precipitated, by filtration, distilling the solution and making use of the marked differences in vapor tension between alcohol and hydrogen peroxide to obtain any desired division of weak and very strong products.

*Example 1.*—An amount of industrial alcohol, of say 90 to 95%, more or less, is preferably cooled to zero or lower. To each litres of alcohol I kilogram of concentrated sulfuric acid (1.84 s. g. or so) is added while cooling and stirring, and the mixture is cooled to zero or lower. For each 4 kilograms of the acid 3 kilograms of sodium peroxide are then added, also under stirring and cooling. The temperature is preferably kept at 0° C. or lower. There is none of the violent reaction (with decomposition) so objectionable when water is used in place of alcohol for diluting the acid. The reaction progresses very gradually; after all the sodium peroxide has been added, the reaction may be accelerated or retarded at will by regulating the temperature by means of the cooling equipment.

I prefer to keep the temperature at not above 10° C. during the earlier part of the reaction, after the sodium peroxide has been added, but have experimentally allowed it to exceed 70° C. and even to approach the boiling point of alcohol, and have yet been able to quickly check the reaction and reduce the temperature by surface cooling alone. Such high temperature is not at all desirable, however.

Considering any danger of violent fire or explosion, I have purposely lighted the mixture, just at the time when the feeding of the sodium peroxide has been completed, and also in the middle of the feeding period. Only feeble, flickering surface fires result, which are put out the moment the open reaction vessel is covered up.

While in case of a water-acid mixture, a fine and floury kind of sodium peroxide is undesirable for the manufacture of hydrogen peroxide, because of its tendency to cause high loss by decomposition, due to too sudden reaction before it becomes properly mixed with an adequate amount of acid underneath the surface of the solution, such sodium peroxide is very satisfactory and desirable when the alcohol-acid mixture is used.

I finish the reaction with the mixture neutral or only slightly acid to litmus paper by adding towards the end a little more sodium peroxide or acid as may be required.

I separate from the solution the sodium sulfate, which has been formed by the reaction, this being effected by filtration and washing, which proceeds freely and rapidly. In regard to the bulk of the sodium sulfate to be removed, it is very much less than in case of a corresponding water-acid reaction mixture, which is due probably to absence of water of crystallization and to the fact that the thinner and purer alcohol solution may be removed from the salt more completely than the thicker and more impure water solution containing from 4 to 6 per cent of dissolved salt.

I prefer to wash the separated sodium sulfate with alcohol rather than with water and to remove the last portions of the alcohol from the salt by heat, and can recover it as condensate, ready for re-use for alcohol-acid mixture.

The sodium sulfate has a value as by-product.

I may join the alcohol, which has been used for washing the salt (or any desired fractions thereof) with the bulk of the alcoholic hydrogen peroxide solution but preferably excluding only the last fraction of wash, very weak in hydrogen peroxide, which I can re-use directly for making new alcohol-acid mixture, or for washing a new lot of salt.

The alcoholic solution of hydrogen peroxide, now ready for distillation, may easily contain 60 to 80 grams $H_2O_2$ per litre, depending on amount of wash used, and it contains only a small amount of sodium sulfate, corresponding to the slight solubility of the salt in the alcoholic solution.

I distill the solution, preferably under reduced pressure to avoid unnecessary high temperature, and to be able to use steam in a suitable heating coil or jacket as a source of heat to exclude fire hazard. On account of the great difference in vapor tension, the natural and marked tendency is for the component parts of the solution to fractionate during distillation as well as during condensation; usually it is sufficient for my purpose of separation to utilize this tendency during condensation alone. I therefore allow the vapors to leave the evaporator and enter the condenser together; very strong hydrogen peroxide solution condenses in the part of the condenser nearest the evaporator; alcohol with a little hydrogen peroxide condenses in the next part of the condenser; I withdraw the products separately. I avoid exposing the solution, which is to be distilled, to the heat (say about 50° C.) for any needless length of time by feeding it into the evaporator only so fast as the evaporator is able to evaporate it, allowing no considerable bulk of solution to accumulate in the evaporator at any time.

The evaporator and condenser must not, of course, be made of any material which prohibitively catalyzes the decomposition of hydrogen peroxide; but there is no need of using acid-proof material, such as glass or quartz, the solution being neutral or nearly so. I preferably use tin (i. e. block tin or tin plate), or tin-antimony alloy.

I withdraw regularly only two separate products from the two parts of the condenser, containing respectively, say, about 350 grams $H_2O_2$ per litre, and from 5 to 10 grams $H_2O_2$ per litre, and I obtain these products in the ratio of about 1 to 5.

But I can readily vary strengths and ratios by simple changes, and it is not difficult to obtain a product with 500 grams or more of $H_2O_2$ per litre.

The bulk of the alcohol, with the small content of hydrogen peroxide, representing something like 10% of the total $H_2O_2$, and about 5-10% of water, I re-use for alcohol-acid mixture and for washing. This percentage figure for $H_2O_2$, as returned to the process for re-use, may be reduced by changes in the withdrawing of products from the condenser.

*Example 2.*—Water and concentrated sulfuric acid are mixed in the proportion of 1 kilogram of acid to 3 litres of water, and the mixture is cooled to zero C. or lower. Sodium peroxide is fed gradually to the acid mixture under cooling and stirring until the mixture reacts neutral or very slightly acid against litmus paper. One or more times, usually once, in the course of the latter half of the feeding period I prefer to remove, by filtration, the sodium sulfate which has been formed during the reaction, in order to have a thinner mixture when I approach the finish; I may join this salt with the rest for the main filtration and washing treatment. The conversion is complete practically as soon as the feeding of the sodium peroxide has been finished, the reaction being very vigorous throughout the period of feeding. It is preferable to keep the temperature down to 10° C., though I have had it reach as high as 35° C. at times. At this higher temperature the loss by decomposition is more serious.

I separate a part of the sodium sulfate which has been formed by the reaction, from the solution, by cooling to 0° C. or lower, filtering and washing the salt with water, joining any desired portion of the wash water with the solution, excluding only the weakest part, which I re-use for water-acid mixture or as a first-wash for another lot of salt.

The solution obtained contains from 4 to 6% sodium sulfate, a large fraction of which being only slightly soluble in alcoholic solution, I remove before distilling by adding up to as high as 5 litres alcohol (say 90 to 95% strength) per 10 litres of solution, cooling to 0° C., or a few degrees lower, filtering and washing. This "second salt" I do not unite directly with the rest of the salt but add it instead to the next finished reaction mixture before the same is subjected to the main filtration treatment. This is done to save any alcohol and hydrogen peroxide which may be in the "second salt."

The solution of hydrogen peroxide, ready for distillation may contain about 60 grams $H_2O_2$ and 5 grams dissolved salt per litre. If I use less wash water and alcohol, I get more concentrated solution. If I have used any very considerably less alcohol, however, the solution contains a somewhat higher percentage of salt, viz, with 1 litre of alcohol to 10 litres water solution, 32 grams salt per litre, with 2.5 litres alcohol to 10 litres water solution, 17 grams salt per litre, with 5 litres alcohol to 10 litres water solution, 5 grams salt per litre. I prefer not to use any less than 3.5 litres alcohol to 10 litres of water solution.

I distill under reduced pressure as before, and I withdraw two or more separate fractions from the condenser. I do not obtain, however, the same sharp and easy fractionation, and I prefer to make a product with only 100 to 110 grams $H_2O_2$ per litre. The weak fraction may contain under these conditions of running, not over 10 grams $H_2O_2$ per litre, and practically all the alcohol, and may be returned to the process, as the alcohol for addition to the next bath, or part of this may be added to the stronger solution to make a uniform product, of somewhat lower strength, for the trade. I may obtain the fractions in the proportion of about 1 to 1. To get stronger solutions of hydrogen peroxide by this method of procedure, I find it advantageous to fractionate into more than two products to obtain a smaller part of the total $H_2O_2$ in the form of solution with 350 grams or more of $H_2O_2$ per litre, and the balance as weaker products. This necessity is due to the fact that the vapors of hydrogen peroxide, alcohol and water may not be fractionated with the same ease as the vapors of hydrogen peroxide and alcohol alone.

I have described procedures with an alcohol-acid mixture and with a water-acid mixture for reaction and subsequent treatments. It is, of course, possible, if desired, to use alcohol-water-acid mixtures of varying proportions for the reaction and subsequent procedure.

Hydrogen peroxide strengths in products of the trade at present is usually given as so and so many volumes of pure oxygen gas available per one volume of the solution, and is simply termed "volumes", 10 volumes, 12 volumes, etc. The standard strength trade product of 10 volumes contains about 30 grams $H_2O_2$ per litre. The strength terms used in my description, 110, 350 and 500 grams of $H_2O_2$ per litre are equivalent to, respectively, about 35, 115 and 165 volumes.

Referring to description, I can, of course, fractionate, or mix the withdrawn fractions, so that I obtain alcoholic solutions of hydrogen peroxide of largely varying strengths, in hydrogen peroxide as well as alcohol. When I use the procedure described Example 1, I prefer to so withdraw and mix the fractions that I obtain a standard, uniform trade product containing 30% hydrogen peroxide, 20% alcohol and 50% water, and to return the balance of the weak fraction, or fractions containing about 90% alcohol, to the process for re-use. When I use the procedure described in Example 2, I prefer to so withdraw and mix the fractions that I obtain a standard, uniform trade product containing 6% hydrogen peroxide, 20% alcohol and the balance water. Such latter product even after keeping for some time, could be sold on a guarantee of 5% $H_2O_2$. I can increase or decrease the strength in peroxide as well as alcohol, when I have any reason to wish to do so.

The nature of the method of production in itself guarantees uniform and extremely high purity of the products, free of the residue and acidity, etc., which have been found objectionable in hydrogen peroxide trade products of the past and which have undoubtedly considerably limited their value and uses.

The strong and highly pure products should find new uses for medicinal purposes. With large scale production at reduced cost per unit of product, the same can find many new industrial uses.

I do not herein claim the method of concentrating $H_2O_2$ solution by distillation (nor any especial principle or design of apparatus therefor) except when used in connection with the presence of alcohol in the liquid to be concentrated, such subject matter forming the object of a separate application, Serial No. 483,424, filed July 9, 1921, (now Patent 1,536,213).

I claim:

1. A process of making hydrogen peroxide consisting in feeding a peroxide of an alkali-forming metal into a mixture containing alcohol and sulfuric acid, to form hydrogen peroxide solution and a sulfate, separating the sulfate and the solution by filtration, distilling the major part at least of the solution in a single operation and separately condensing from the vapors formed in such operation, a solution rich in hydrogen peroxide and another solution rich in alcohol.

2. A process of making hydrogen peroxide consisting in feeding sodium peroxide into a mixture containing alcohol and sulfuric acid to form hydrogen peroxide solution and sodium sulfate, separating the sodium sulfate and solution distilling the major part at least of the solution in a single operation and separately condensing from the vapors formed in such operation a solution rich in hydrogen peroxide and another solution rich in alcohol.

3. A process of making hydrogen peroxide consisting in feeding a peroxide of an alkali-forming metal into a mixture of alcohol, water and sulfuric acid to form hydrogen peroxide solution and a sulfate, separating the sulfate and solution, distilling the major part at least of the solution in a single operation and separately condensing from the vapors formed in such operation, a solution rich in hydrogen peroxide and another solution rich in alcohol.

4. A process of making hydrogen peroxide which comprises feeding a peroxide of an alkali-forming metal into a diluted acid to form hydrogen peroxide solution and an alkali-forming metal salt of such acid, such acid being one that does not substantially decompose hydrogen peroxide separating the hydrogen peroxide solution from salt formed, adding alcohol to such solution, whereby at least the major part of any dissolved alkali-forming metal salt of the added acid is precipitated, separating such precipitated salt from the remaining solution of hydrogen peroxide, distilling the major part at least of the solution in a single operation and separately condensing from the vapors formed in such operation, a solution rich in hydrogen peroxide and another solution rich in alcohol.

5. A process of making hydrogen peroxide consisting in feeding sodium peroxide into diluted sulfuric acid to form hydrogen peroxide solution and sodium sulfate, separating the sodium sulfate and solution, adding alcohol to the solution to precipitate dissolved sodium sulfate, separating the precipitated sodium sulfate and the solution distilling the major part at least of the solution in a single operation and separately condensing from the vapors formed in such operation, a solution rich in hydrogen peroxide and another solution rich in alcohol.

6. The process of making hydrogen peroxide which comprises feeding a peroxide of an alkali-forming metal into a mixture containing alcohol and an acid which will not cause decomposition of the hydrogen peroxide solution, thereby forming hydrogen peroxide solution and a salt of the acid used, separating the formed salt and the solution from each other, and distilling the major part at least of the solution in a single operation and separately condensing from the vapors formed in such operation, a solution rich in hydrogen peroxide and another solution rich in alcohol.

7. In the production of hydrogen peroxide, the herein described step of distilling the major part at least of a liquid mixture containing water, alcohol and hydrogen peroxide, in a single operation, and separately condensing from the vapors formed in such operation, a mixture rich in hydrogen peroxide and another mixture rich in alcohol.

In testimony whereof I affix my signature.

ARTHUR L. HALVORSEN.